United States Patent [19]

Woodworth et al.

[11] Patent Number: 4,936,201
[45] Date of Patent: Jun. 26, 1990

[54] TURNER ARM ASSEMBLY FOR A DOUGHNUT FRYER

[75] Inventors: Fred G. Woodworth, Kent; Louis J. Agathos, Mercer Island; John P. McCarthy, Vashon, all of Wash.

[73] Assignee: Belshaw Bros., Inc., Seattle, Wash.

[21] Appl. No.: 405,893

[22] Filed: Sep. 12, 1989

[51] Int. Cl.⁵ ............................................. A47J 37/12
[52] U.S. Cl. .................................... 99/405; 99/409; 99/644; 198/861.5
[58] Field of Search ............... 99/403, 404, 405, 406, 99/407, 408, 409, 442, 443 C, 644, 354; 198/404, 445, 446, 836, 861.5; 414/764; 134/66, 134

[56] References Cited

U.S. PATENT DOCUMENTS

| | | | |
|---|---|---|---|
| 2,027,558 | 1/1936 | Sherwood | 99/409 |
| 2,543,403 | 2/1951 | Duval | 99/409 |
| 2,735,357 | 2/1956 | Gagnon | 99/409 |
| 3,154,187 | 10/1964 | Roth | 198/404 |
| 3,228,320 | 1/1966 | Tumonis | 99/406 |
| 4,082,033 | 4/1978 | Fester | 99/406 |
| 4,176,590 | 12/1979 | Kochan | 99/409 |
| 4,189,994 | 2/1980 | Schmader | 99/405 |
| 4,370,921 | 2/1983 | Moller et al. | 198/836 |
| 4,628,804 | 12/1986 | Belshaw et al. | 198/861.5 |
| 4,706,556 | 11/1987 | Wallace et al. | 99/404 |

OTHER PUBLICATIONS

Belshaw Bros., Inc., Prior Turner Assembly, 1988, Three (3) Drawing Sheets.

*Primary Examiner*—Timothy F. Simone
*Attorney, Agent, or Firm*—Seed and Berry

[57] ABSTRACT

A turner arm assembly for a doughnut fryer has a pivot axle on one end that is provided with a hardened ball mounted in a cylindrical hardened bearing of the sidewall of a conveyor assembly. In an alternative form a straight diameter pivot axle is provided in a crowned internal diameter of the hardened bearing. The opposite end of the turner arm assembly is drivingly connected to a drive axle fixed to a cam. A removable stop prevents the pivot axle from moving outwardly of the sidewall of the conveyor assembly. The turner arm assembly is removed by moving the stop, shifting the turner arm axially until the turner arm is free of the drive axle, then sliding the turner arm back inwardly of the sidewall of the conveyor assembly while the pivot axle connection with the sidewall of the conveyor assembly gives complete free movement of upward pivotal movement of the turner arm to clear the opposite end of the turner arm over the sidewall for removal.

12 Claims, 2 Drawing Sheets

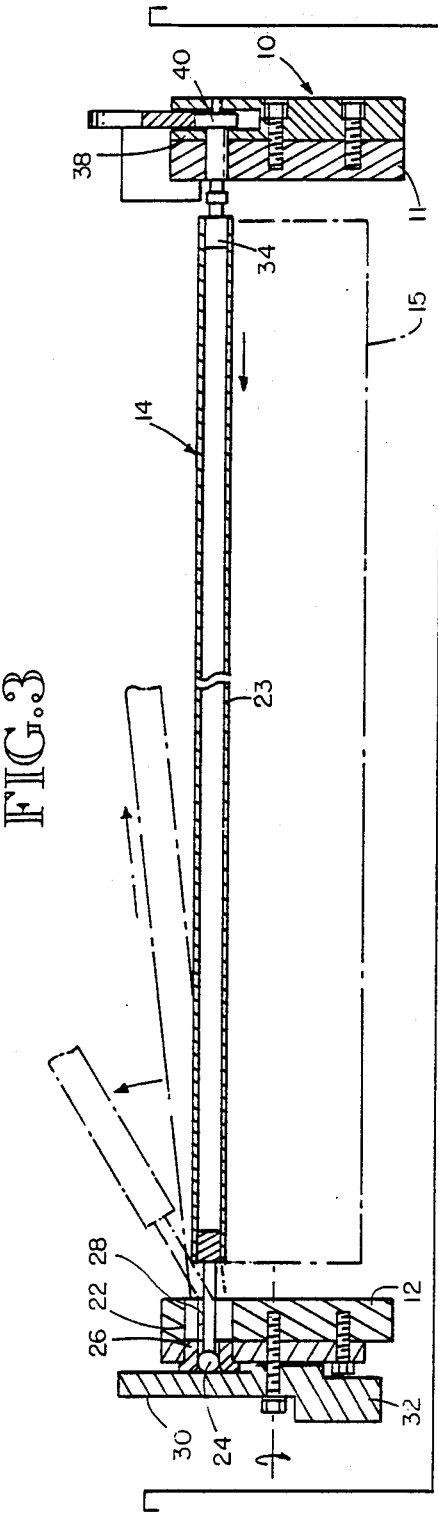
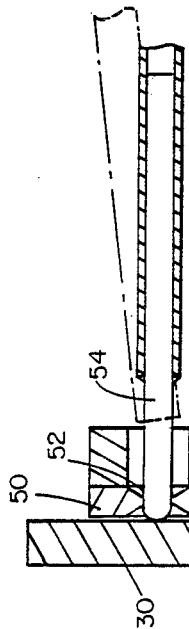
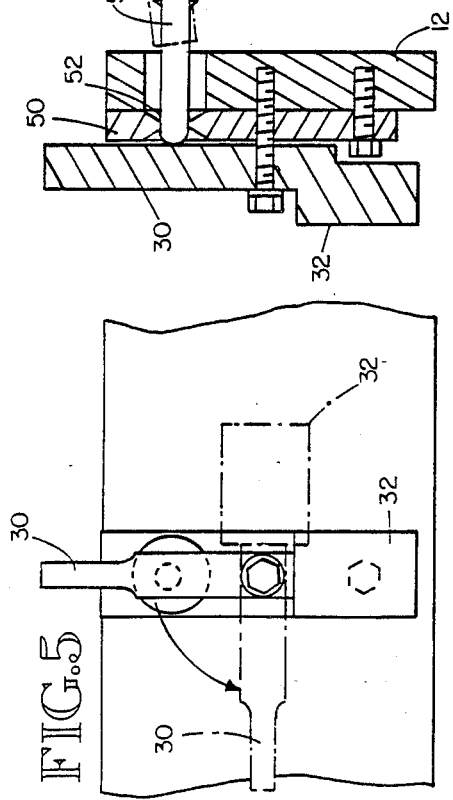

TURNER ARM ASSEMBLY FOR A DOUGHNUT FRYER

FIELD OF THE INVENTION

This invention pertains to doughnut fryers in which a doughnut or other edible fried food product is propelled through a tank of hot cooking oil and flipped over to cook on its opposite side. Particularly, this invention is directed to the turner arm assembly for doughnut fryers.

DESCRIPTION OF THE PRIOR ART

Fryers for doughnuts or other edible food products include a hot cooking oil fryer tank, a conveyor assembly for moving the doughnuts through the tank, a turner arm assembly to invert the doughnut so that the upper side of the doughnut which is floating in the fryer can be flipped over and be cooked. The turner arm assembly requires cleaning and must therefore be easily removed from the conveyor assembly. This removal of the turner arm assembly is usually done when the hot oil remains in the tank to reduce down time on the fryer and thus is a task which must be easily accomplished.

In the past, removal of the turner arm assembly required removal of the whole conveyor assembly from the fryer tank. One attempt was made to mount the turner arm assembly in a bearing which would allow an axle of the turner arm assembly to be pivoted. This attempt proved unsatisfactory since the pivot end of the turner arm assembly was too restricted, causing the free end of the turner to not readily clear the opposite end of the conveyor assembly without considerable binding and difficulty.

SUMMARY OF THE INVENTION

It is an object of this invention to provide a turner arm assembly in a hot cooking oil fryer that can easily be pivoted upwardly for removal out of the conveyor assembly. In one embodiment of the invention, the pivot end of the turner arm is provided with an enlarged hardened ball that rotates in a bearing having a cylindrical inner opening. The inner opening holds the ball relatively snugly against any form of upward or fore and aft lateral movement, but allows free pivotal movement of the pivot end of the turner within the bearing for lifting or pivoting the turner arm upwardly for removal from the conveyor assembly. In another embodiment, the pivot end of the turner arm is a continuous straight shaft mounted in a hardened bearing with an internal opening having a crowned cross section. In this alternative embodiment, the straight shaft can rotate about the crown allowing the turner arm to be pivoted upwardly for removal from the conveyor assembly.

While the invention is best described for handling doughnuts, it is clear that other forms of fried products can be cooked in this fryer. The invention is simple in construction and enables easy removal of the turner arm by a single operator.

BRIEF DESCRIPTION OF THE DRAWINGS

FIG. 3 is a vertical section through the fryer taken along the line 3—3 of FIG. 1.

FIG. 4 is a fragmentary vertical section of a second embodiment taken along a line similar to the line 3—3 of FIG. 1.

FIG. 5 is a fragmentary side elevation looking into the left side of the fryer as shown in FIG. 3.

DETAILED DESCRIPTION OF THE PREFERRED EMBODIMENTS

Figure 1:
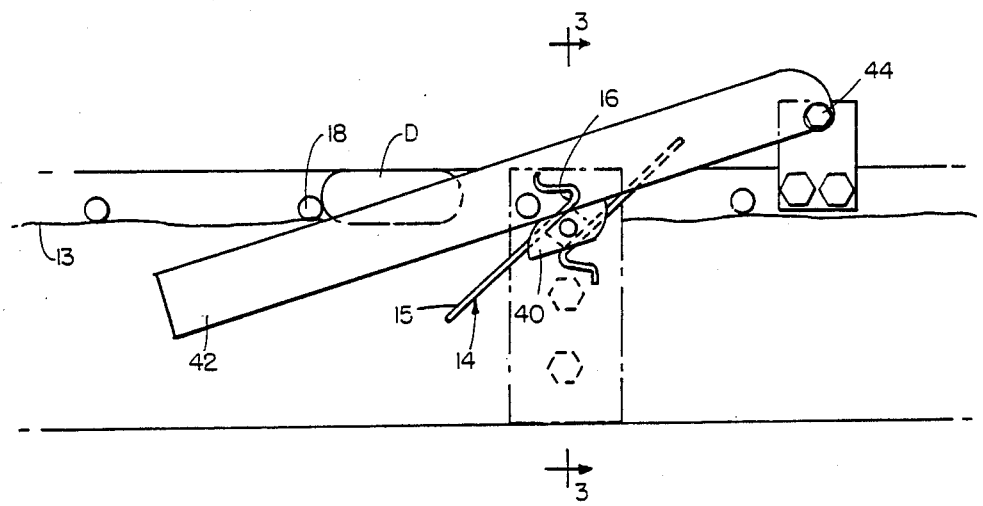
FIG. 1 is a side elevation of one end of a fryer embodying the principles of the invention.

As best shown in FIGS. 1 and 3, a fryer conveyor assembly 10 has sidewalls 11 and 12 mounted in a tank 9 which hold a level of fluid or cooking oil 13. Mounted in the conveyor assembly is a turner arm assembly 14 having turner blades or fins 15 and turner drive sockets 16.

Figure 2:
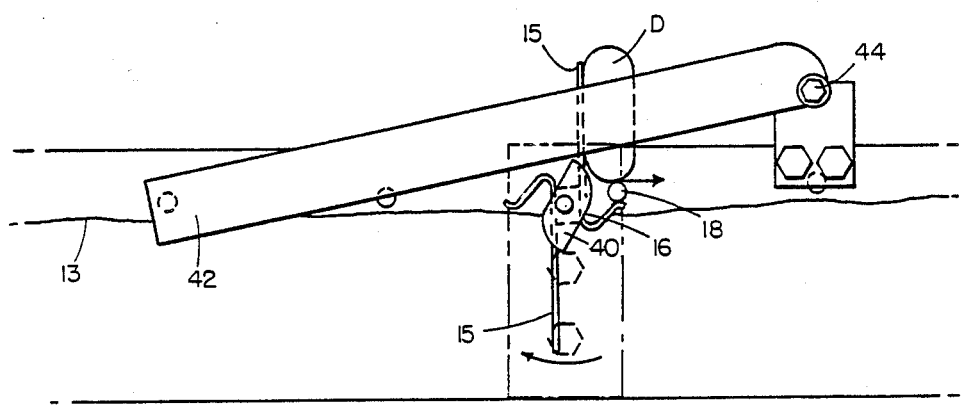
FIG. 2 is a second side elevation showing a second operative position.
Figure 1:
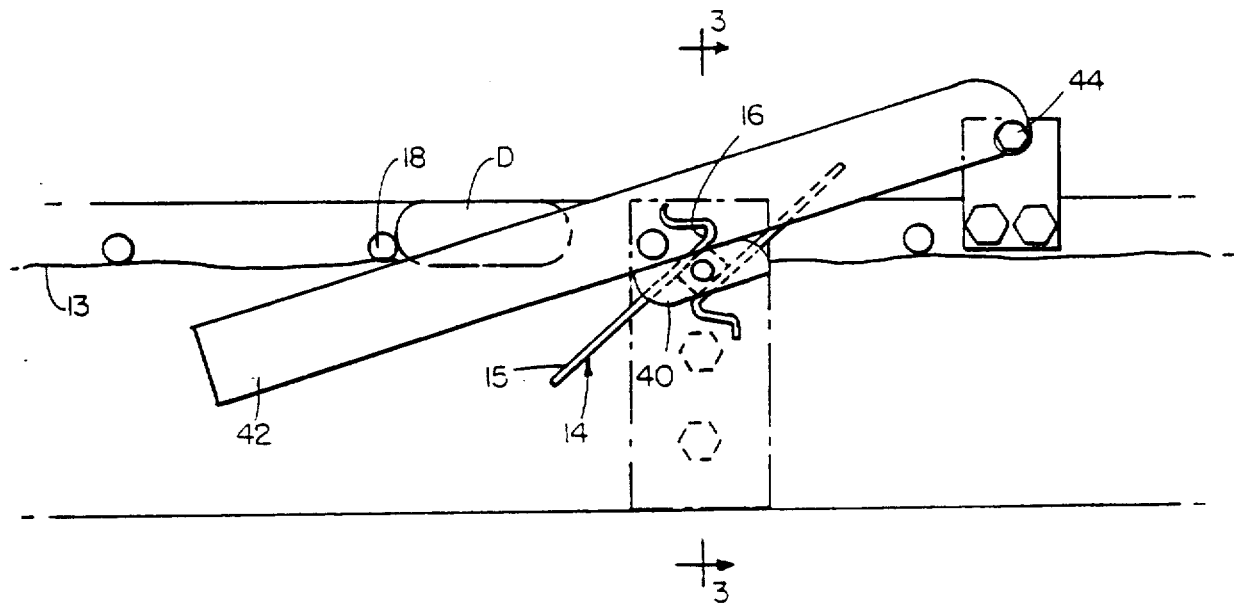
Figure 2:
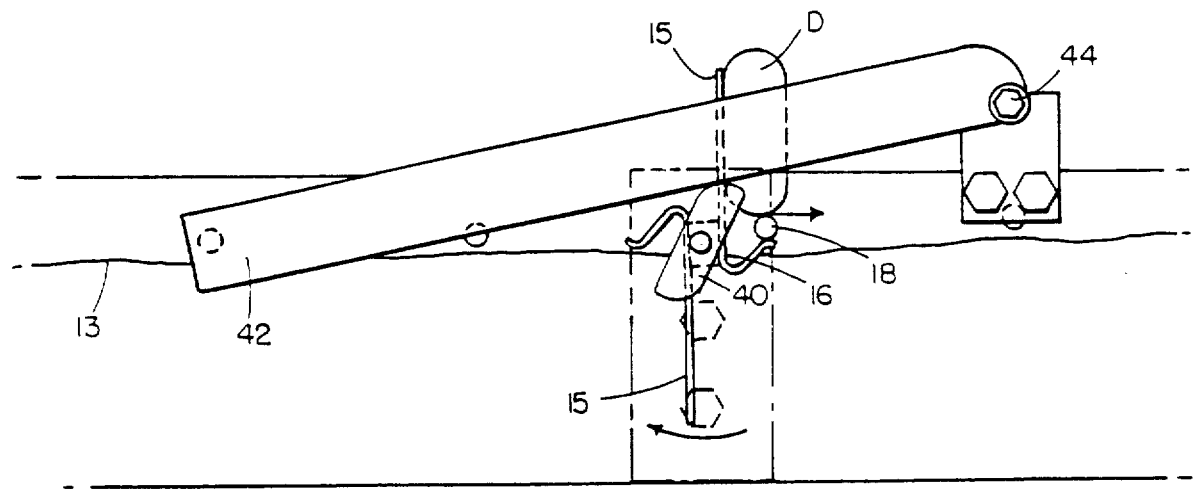

As best shown in FIG. 1, the conveyor assembly is conventional and includes pusher bars 18 which move from left to right in pushing the doughnuts or other food products D. As is well known, the doughnut floats in the hot cooking oil 13 cooking the bottom side of the doughnut. As the pusher bar brings the doughnut to a turner fin 15 the doughnut floats over the turner fin while the pusher bar enters the socket 16. Further movement of the pusher bar as shown in FIG. 2 causes the turner arm to rotate. The fin 15 will lift the doughnut upwardly flipping it into a partially inverted position. A cam mechanism, to be later described, then completes the flipping of the turner so that the doughnut is left upside down with its uncooked side in the fryer cooking oil.

A difficulty is that the turner arm fins 15 must be wide enough (as shown in phantom lines in FIG. 3), to prevent the doughnuts, particularly small doughnuts or spherical solid doughnuts called "holes", from passing around the lateral edges of the fins. Thus, it is desirable that the fins extend as far as possible across the width of the fryer. However, this turner arm assembly must be removed for cleaning the turner arm or to handle different varieties of doughnuts or other food products. Furthermore, the depth of the fins, as shown in FIGS. 1 and 3, must be sufficient to be able to completely support a doughnut for flipping it over.

These requirements create considerable difficulty when removing the turner arm assembly. It must preferably be pivoted upwardly by a workman grasping the top of the fin with vice grip pliers or other designated gripping members and lifted over the conveyor and the sidewall of the tank.

As best shown in FIG. 3, the turner arm assembly of one embodiment has an elongated axle 22 shaft 23. The axle terminates in a hardened enlarged ball 24. This hardened ball is mounted in a hardened bearing 26 having a cylindrical internal opening 28. A stop 30 prevents the axle from moving laterally outward of the sidewall 12. The stop is pivotally mounted and has at its lower end a weight 32. The weight keeps the stop 30 in front of the opening 28 so that the axle cannot move outwardly of the tank sidewall. As shown in FIG. 5, however, the stop may be manually pivoted out of the way allowing the axle to be moved outwardly for disengaging the opposite end of the hollow shaft 23 from a cam axle 34. Once the stop 30 is released the weight will bring the stop into the solid line position, as shown in FIG. 5 again closing the opening 28.

The opposite end of the turner arm shaft is slidably and drivingly mounted on a rectangular end of a cam axle 34. The cam axle also is rotatably mounted in a hardened bearing 38. A cam 40 is rigidly connected to the axle. An elongated weight 42 is pivotally mounted as at 44 and rests on the cam 40. As best shown in FIG. 1, the weight holds the cam in a generally horizontal position. As the pusher rod 18 enters a socket 16 and rotates the turner arm, the cam is rotated by the shaft 14 into the position shown in FIG. 2. The pusher rod then leaves the socket while the weight applies a downward force overcenter to the right of the cam axle imposing a clockwise moment on the cam 40 causing the turner arm to rapidly continue its rotation rapidly inverting the doughnut for cooking the underside of the doughnut.

Removal of the turner arm assembly is achieved by pivoting the stop 30. The turner shaft can then slide axially to the left in FIG. 3 far enough for the turner arm shaft to become disengaged from the rectangular cam axle 34. Then the turner arm shaft can be slid back to the right putting the ball toward the inner end of the bearing 26 until the arm can be swung upwardly, as shown in the phantom line positions in FIG. 3. With the considerable freedom for pivoting the turner arm upwardly, the free end of the arm on the right side of the tank can easily clear the sidewall of the tank and the conveyor. The turner arm is then removed by sliding the ball clear of the sidewall 12.

In FIG. 4 the apparatus is essentially the same except that a hardened bearing 50 is provided with a crowned interior opening 52. The turner arm axle 54 rather than having an enlarged ball is simply a straight hardened shaft. A straight shaft in cooperation with the crowned inner opening 52 allows the turner arm shaft to be also freely rotated upwardly to lift the remote end of the turner arm shaft up beyond the conveyor and sidewall 11.

Thus, as is readily apparent, the unique turner arm assembly provides a simple inexpensive mechanism by which the turner arm of the conveyor can be pivotally removed from the hot liquid environment of the fryer tank. The pivotal connections to the pivot axle side of the turner arm shaft greatly facilitate this ease of pivotal movement. While the preferred embodiments of this invention have thus been illustrated and described, it should be apparent that other variations will be apparent to one of ordinary skill in the art. Accordingly, the invention is not to be limited to the specific embodiments illustrated in the drawings.

We claim:

1. In a hot oil fryer of the type suitable for frying doughnuts and other food products and having a cooking oil-filled tank, a conveyor assembly with opposite sidewalls for pushing the doughnuts floating on the cooking oil through the tank, and a turner arm for lifting the doughnuts and inverting them, the improvement comprising:
   the turner arm having a first axle on one end and a second axle on the other end;
   the first axle rotatably supported on the sidewall of the conveyor assembly and being movable axially relative to the sidewall, said axle being mounted for angular pivotal upward movement;
   a second axle including means for rotating the turner arm and for disconnecting the turner arm from the conveyor assembly, whereby the turner arm can be removed from the tank on the second axle side of the conveyor assembly, pivoted upwardly about the opposite sidewall for removal from the conveyor assembly; and
   said first axle being rotatably supported by bearing means limiting lateral movement of the axle relative to the axle but allowing free upward pivotal movement of the axle for lifting the turner arm above the opposite sidewall of the conveyor assembly for removal.

2. The fryer of claim 1, said bearing means including a hardened ring, said first axle having an enlarged hardened ball rotatably mounted in the hardened ring.

3. The fryer of claim 1, said bearing means being a hardened ring having a crowned internal opening, said first axle being a straight uniform diameter shaft capable of rocking upwardly about said crowned internal opening.

4. The fryer of claim 1, including a stop member moveably secured to the outside of the sidewall of the conveyor assembly adjacent to the first axle for blocking outward axial movement of the first axle, said stop member movable to allow axial outward movement of the first axle.

5. The fryer of claim 1, including a cam fixed to the second axle, and a cam weight engaging the cam for drivingly rotating the cam to rotate the turner arm.

6. The fryer of claim 2, including a stop member moveably secured to the outside of the sidewall of the conveyor assembly adjacent to the first axle for blocking outward axial movement of the first axle, said stop member movable to allow axial outward movement of the first axle, and further including a cam fixed to the second axle, and a cam weight engaging the cam for drivingly rotating the cam to rotate the turner arm.

7. The fryer of claim 6, the conveyor assembly including a pushing bar movable along the tank, said turner arm having a turner arm socket engageable by the pusher bar to rotate the turner arm, said cam weight completing the rotation of the turner arm.

8. The fryer of claim 3, including a stop member moveably secured to the outside of the sidewall of the conveyor assembly adjacent to the first axle for blocking outward axial movement of the first axle, said stop member movable to allow axial outward movement of the first axle, and further including a cam fixed to the second axle, and a cam weight engaging the cam for drivingly rotating the cam to rotate the turner arm.

9. A turner arm assembly for use in a doughnut fryer having a tank for holding hot cooking oil, comprising a turner arm having a turner arm drive axle on one end rotatably mounted in the tank and a turner arm pivot axle end, means mounting the pivot axle end for free upward pivotal movement but limited lateral movement, means releasably blocking axial outward movement of the pivot axle end of the turner arm, said releasable blocking means being movable to allow axial movement of the pivot end of the axle.

10. The turner arm assembly of claim 9, including a conveyor in the tank having pusher bars, sockets on said turner arm engageable by said pusher bars for rotating said turner arm for inverting the doughnuts, and a cam fixed to said turner arm drive axle, a cam weight engageable with the cam for continuing the rotation of the turner arm.

11. The turner arm assembly of claim 9, said pivot axle end of said turner arm having an enlarged-hardened ball rotatably mounted in a bearing having a cylindrical inner opening.

12. The turner arm assembly of claim 9, said pivot axle end of said turner arm having a straight axle, said mounting means including a hardened bearing having a crowned inner opening for allowing axial and upward pivotal movement of said pivot axle end.

* * * * *

UNITED STATES PATENT AND TRADEMARK OFFICE
CERTIFICATE OF CORRECTION

PATENT NO. : 4,936,201

DATED : June 26, 1990

INVENTOR(S) : Fred G. Woodworth, et al

It is certified that error appears in the above-identified patent and that said Letters Patent is hereby corrected as shown below:

Please delete Figures 1 and 2 in the Drawings Section of the issued patent and substitute therefor the enclosed Figures 1 and 2. (see attached sheet)

Signed and Sealed this

Twenty-fourth Day of December, 1991

*Attest:*

HARRY F. MANBECK, JR.

*Attesting Officer*     *Commissioner of Patents and Trademarks*